United States Patent
Kageyama et al.

[11] Patent Number: 5,210,690
[45] Date of Patent: May 11, 1993

[54] ANTI-SKID CONTROL SYSTEM FOR VEHICLE

[75] Inventors: Fumio Kageyama; Haruki Okazaki; Toru Onaka; Toshiaki Tsuyama, all of Hiroshima, Japan

[73] Assignee: Mazda Motor Corporation, Hiroshima, Japan

[21] Appl. No.: 682,086

[22] Filed: Apr. 9, 1991

[30] Foreign Application Priority Data

Apr. 10, 1990 [JP] Japan ................................. 2-94656

[51] Int. Cl.$^5$ ............................................. B60T 8/66
[52] U.S. Cl. .................. 364/426.02; 303/109; 303/95
[58] Field of Search ............ 364/426.01, 426.02, 364/565; 303/95, 96, 98, 102, 109

[56] References Cited

U.S. PATENT DOCUMENTS

| | | | |
|---|---|---|---|
| 4,991,910 | 2/1991 | Shimanuki et al. | 303/109 |
| 5,019,984 | 5/1991 | Masaki et al. | 364/426.02 |
| 5,065,327 | 11/1991 | Yahagi et al. | 364/426.02 |
| 5,072,393 | 12/1991 | Mori et al. | 364/426.02 |
| 5,092,662 | 3/1992 | Okubo | 303/106 |
| 5,123,715 | 6/1992 | Okubo | 303/108 |
| 5,138,556 | 8/1992 | Yoshino | 364/426.02 |

*Primary Examiner*—Thomas G. Black
*Attorney, Agent, or Firm*—Sixbey, Friedman, Leedom & Ferguson

[57] ABSTRACT

A first estimated vehicle speed is calculated on the basis of the highest of the speeds of the wheels and the deceleration of the vehicle. A second estimated vehicle speed which begins to reduce from a predetermined value at a predetermined rate independent from the change in the highest of the speeds of the wheels from the time the first estimated vehicle speed falls to the predetermined value is calculated. A slip ratio of each wheel is calculated on the basis of the first estimated vehicle speed when the first estimated vehicle speed is not lower than the predetermined value and on the basis of the second estimated vehicle speed when the first estimated vehicle speed is lower than the predetermined value. The braking force applied to each wheel is controlled so that the slip ratio of the wheel converges on a target slip ratio.

8 Claims, 5 Drawing Sheets

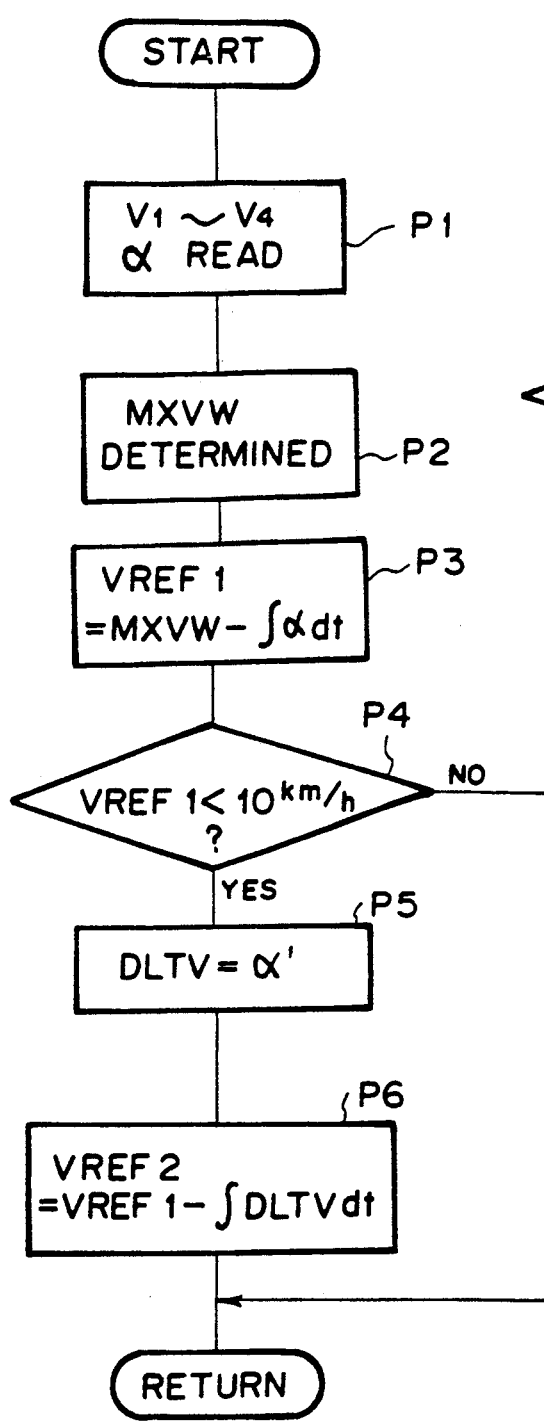
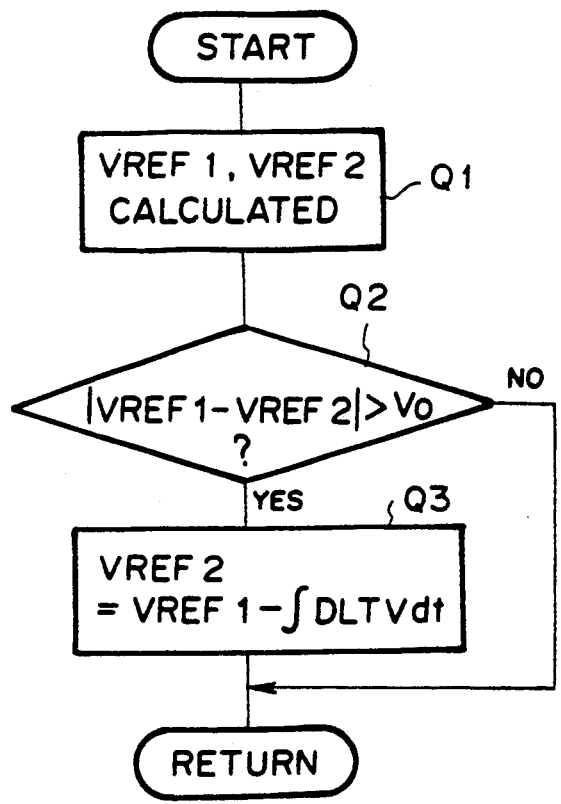

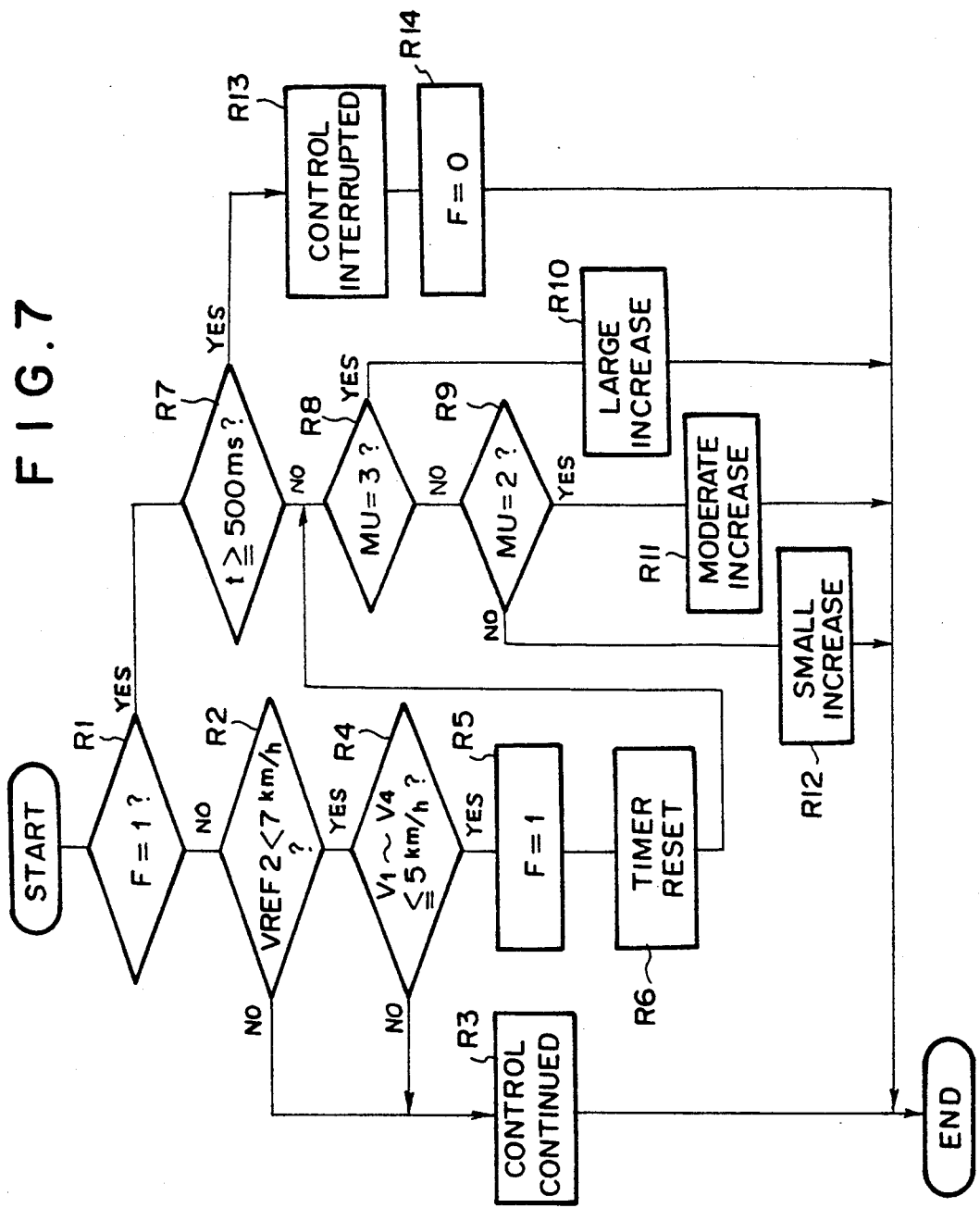

ANTI-SKID CONTROL SYSTEM FOR VEHICLE

BACKGROUND OF THE INVENTION

1. Field of the Invention

This invention relates to an anti-skid brake control system for a vehicle.

2. Description of the Prior Art

There has been known an anti-skid brake control system for a vehicle in which the slip ratio of each of the wheels is calculated and the braking force applied to the wheel is controlled so that the slip ratio of the wheel converges on a target slip ratio at which the friction coefficient between the wheel and the road surface is maximized in order to prevent the wheel from locking during braking.

The slip ratio of the wheel can be calculated by various methods. In one of the methods, the slip ratio of each wheels is calculated on the basis of the difference between the speed of the wheel and an estimated vehicle speed which is determined on the basis of the highest of the wheel speeds and the deceleration of the vehicle body.

The idea of calculating the vehicle speed on the basis of the highest wheel speed (the highest of the wheel speeds) is disclosed, for instance, in Japanese Patent Publication No. 57(1982)-7940.

However, when the anti-skid brake control is effected on the basis of the slip ratio calculated in the manner described above, there is a problem that the driver has a feeling that the braking effect abruptly deteriorates at extremely low vehicle speed intermediately before the vehicle stops.

That is, during braking, especially when the anti-skid brake control is being effected, the highest wheel speed fluctuates due to fluctuation in the brake fluid pressure, and accordingly, the estimated vehicle speed per se fluctuates.

Generally, during braking, though the difference between the vehicle speed and the wheel speed is large to some extent so long as the vehicle speed is large to some extent, the difference between the vehicle speed and the wheel speed is very small at extremely low vehicle speed intermediately before the vehicle stops.

As a result, at extremely low vehicle speed, the calculated slip ratio fluctuates by a large amount in response to fluctuation in the estimated vehicle speed, and the slip ratio alternately becomes larger and smaller, whereby unnecessary reduction of the brake fluid pressure is done immediately before the vehicle stops. This causes the driver to have a feeling that the braking effect abruptly deteriorates.

SUMMARY OF THE INVENTION

In view of the foregoing observations and description, the primary object of the present invention is to provide an anti-skid brake control system in which unnecessary reduction of the brake fluid pressure at extremely low vehicle speed during the anti-skid brake control can be avoided.

In accordance with the present invention, there is provided an anti-skid brake control system for a vehicle comprising a wheel speed detecting means which detects the speeds of wheels of the vehicle, a deceleration detecting means which detects the deceleration of the vehicle, a first estimated vehicle speed calculating means which calculates a first estimated vehicle speed on the basis of the highest of the speeds of the wheels as detected by the wheel speed detecting means and the deceleration of the vehicle as detected by the deceleration detecting means, a second estimated vehicle speed calculating means for calculating a second estimated vehicle speed which begins to reduce from a predetermined value at a predetermined rate independent from the change in the highest of the speeds of the wheels from the time the first estimated vehicle speed as calculated by the first estimated vehicle speed calculating means falls to the predetermined value, a selecting means which adopts the first estimated vehicle speed as a final estimated vehicle speed when the first estimated vehicle speed is not lower than the predetermined value and adopts the second estimated vehicle speed as the final estimated vehicle speed when the first estimated vehicle speed is lower than the predetermined value, a slip ratio calculating means which calculates the slip ratio of each wheel on the basis of the final estimated vehicle speed determined by the selecting means and the speed of the wheel as detected by the wheel speed detecting means, and a braking force control means which controls the braking force applied to each wheel so that the slip ratio of the wheel as calculated by the slip ratio calculating means converges on a target slip ratio.

In the anti-skid brake control system of the present invention, after the first estimated vehicle speed which depends on the highest wheel speed fall to a predetermined value, the slip ratio is calculated on the basis of the second estimated vehicle speed which is independent from the highest wheel speed, and in response to fluctuation in the highest wheel speed, whereby unnecessary reduction of the brake fluid pressure immediately before the vehicle stops can be avoided.

The predetermined rate may be determined in various ways. For example, it may be a constant value which is empirically determined, or may be the deceleration of the vehicle at the time the first estimated vehicle speed falls below the predetermined value. Further the predetermined rate may be changed according to various factors such as the friction coefficient of the road surface so that better anti-skid brake control can be realized.

BRIEF DESCRIPTION OF THE DRAWINGS

FIG. 5 is a flow chart showing another example of the manner for determining the final estimated vehicle speed, FIG. 6 is a flow chart showing still another example of the manner for determining the final estimated vehicle speed, and FIG. 7 is a flow chart for illustrating the procedure for terminating the anti-skid brake control.

DESCRIPTION OF THE PREFERRED EMBODIMENT

Figure 1:
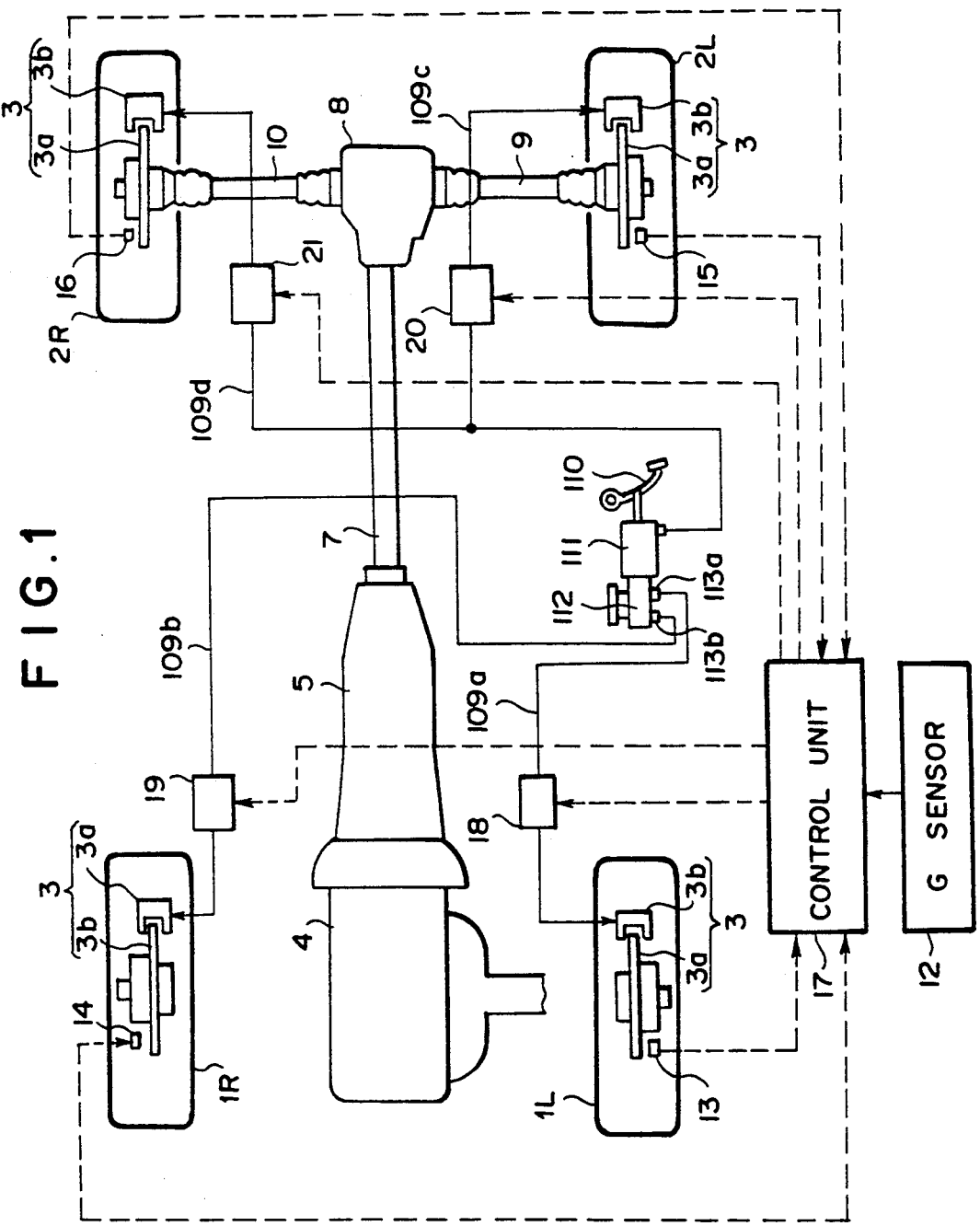
FIG. 1 is a schematic view of a vehicle provided with an anti-skid brake control system in accordance with an embodiment of the present invention.

In FIG. 1, a vehicle has an engine 4 mounted on the front part of the vehicle, and the output torque of the engine 4 is transmitted to left and right rear wheels 2L and 2R by way of an automatic transmission 5, a propeller shaft 7, a differential 8, and left and right drive shafts 9 and 10. Reference numerals 1L and 1R respectively denote left and right front wheels.

The wheels 1L, 1R, 2L and 2R are provided with brakes 3 each comprising a disk rotor 3a and a caliper 3b, and brake fluid pressure is applied to the respective calipers 3b respectively through brake lines 109a to 109d.

A brake pedal 110 is connected to a tandem master cylinder 112 by way of a power brake booster 111. Brake fluid pressure produced by the master cylinder 112 is transmitted to the caliper 3b of the left front wheel 1L by way of the brake line 109a which is connected to a first discharge port 113a of the master cylinder 112 and to the caliper 3b of the right front wheel brake 1R by way of the brake line 109b which is connected to a second discharge port 113bb of the master cylinder 112.

The calipers 3b of the left and right wheels 2L and 2R are connected to the power brake booster 111 by way of brake lines 109c and 109d. The brake lines 109a to 109d are respectively provided with brake fluid pressure control valves 18 to 21 which controls the brake fluid pressures applied to the brakes 3 under the control of a control unit 17.

Signals from an acceleration sensor 12 which detects the deceleration of the vehicle body and wheel speed sensors 13 to 16 which detects the rotational speeds of the left and right front wheels 1L and 1R and the left and right rear wheels 2L and 2R (wheel speeds) are input into the control unit 17.

In the anti-skid brake control, the control unit 17 calculates the slip ratios of the respective wheels 1L, 1R, 2L and 2R on the basis of the signals from the acceleration sensors 12 and the wheel speed sensors 13 to 16, and outputs control signals to the brake fluid pressure control valves 18 to 21 to cause them to control the brake fluid pressure applied to the brakes 3 so that the slip ratio of each wheel converges on a target slip ratio at which the most efficient braking takes place.

Figure 2:
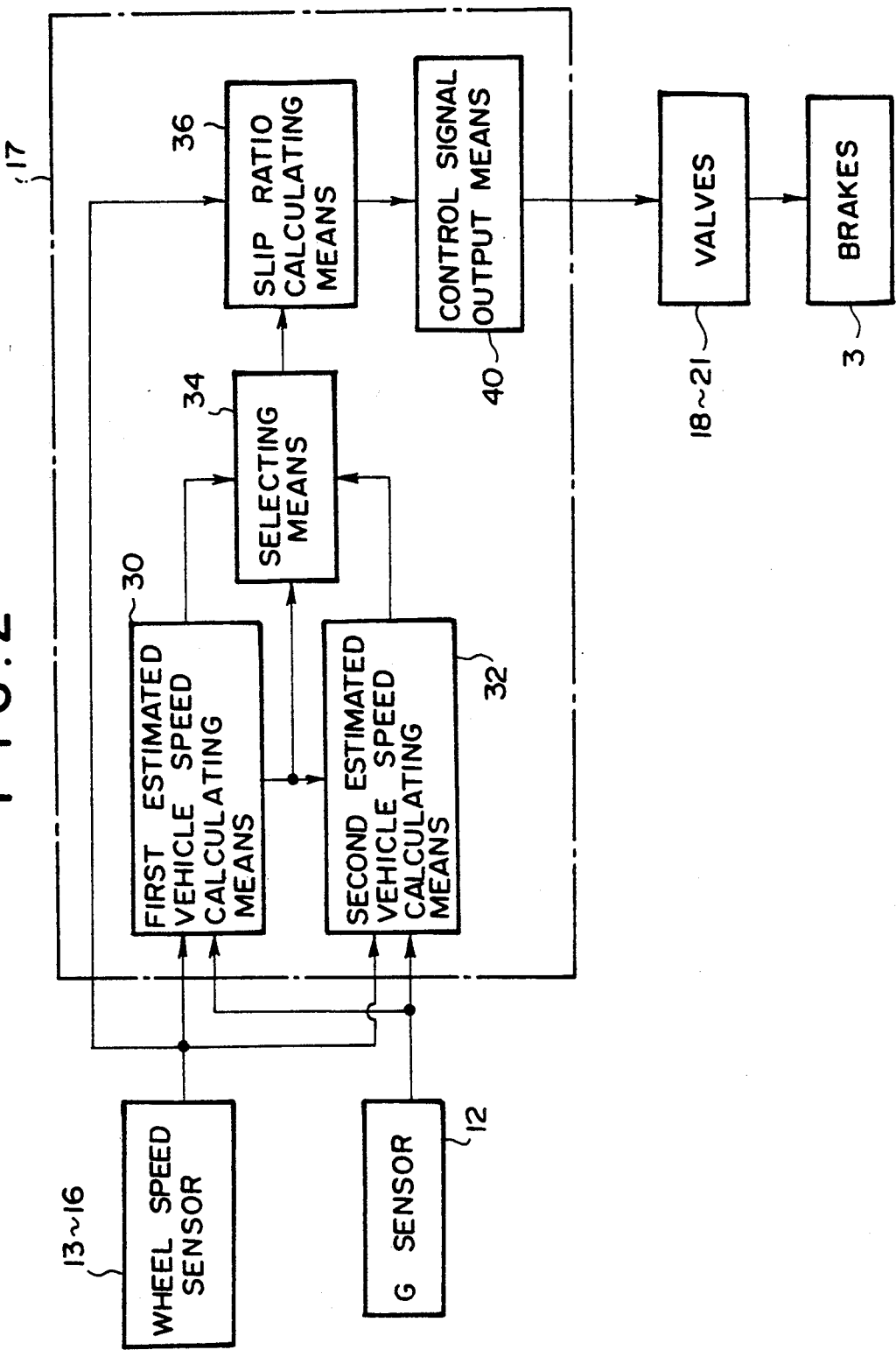
FIG. 2 is a block diagram for illustrating the arrangement of the anti-skid brake control system of the embodiment.

As shown in FIG. 2, the control unit 17 comprises a first estimated vehicle speed calculating means 30 which calculates a first estimated vehicle speed on the basis of the highest of the speeds of the wheels as detected by the wheel speed sensors 13 to 16 and the deceleration of the vehicle as detected by the acceleration sensor 12, a second estimated vehicle speed calculating means 34 for calculating a second estimated vehicle speed which, when the first estimated vehicle speed as calculated by the first estimated vehicle speed calculating means 30 falls to a predetermined value, begins to reduce from the predetermined value at a predetermined rate independent from the change in the highest of the speeds of the wheels, a selecting means 34 which adopts the first estimated vehicle speed as a final estimated vehicle speed when the first estimated vehicle speed is not lower than the predetermined value and adopts the second estimated vehicle speed as the final estimated vehicle speed when the first estimated vehicle speed is lower than the predetermined value, a slip ratio calculating means 36 which calculates the slip ratio of each wheel on the basis of the final estimated vehicle speed determined by the selecting means 34 and the speed of the wheel as detected by the wheel speed sensors 13 to 16, and an anti-skid brake control signal output means 40 which outputs control signals to the brake fluid pressure control valves 18 to 21 to cause them to control the brake fluid pressure applied to the brakes 3 so that the slip ratio of each wheel converges on the target slip ratio.

Figure 3:
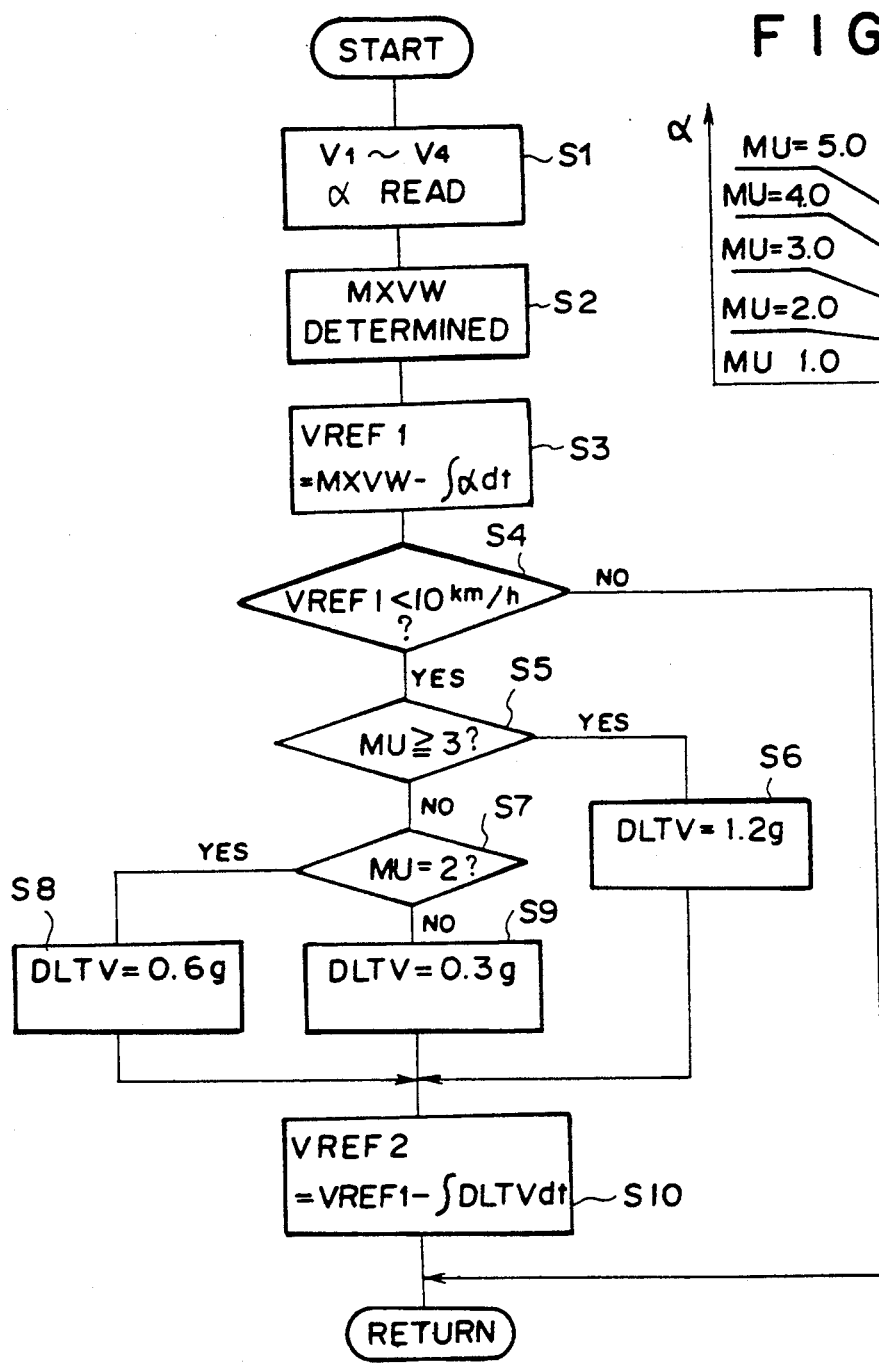
FIG. 3 is a flow chart showing an example of the manner for determining the final estimated vehicle speed.

FIG. 3 is a flow chart showing an example of the manner in which the control unit 17 determines the final estimated vehicle speed.

In this example, the second estimated vehicle speed is obtained by reducing the predetermined value at a constant rate which is changed according to the friction coefficient of the road surface.

That is, in step S1, the wheels speeds V1 to V4 of the wheels 1L, 1R, 2L and 2R as detected by the wheel speed sensors 13 to 16 and the deceleration of the vehicle u are read. Then in step S2, the highest wheel speed MXVW, that is, the highest of the wheels speeds V1 to V4, is determined and, in step S3, the first estimated vehicle speed VREF1 is calculated on the basis of the highest wheel speed MXVW and the deceleration of the vehicle $\alpha$ according to the following formula.

$$VREF1 = MXVW - \int \alpha dt \qquad (1)$$

The first estimated vehicle speed VREF1 may be calculated on the basis of the highest wheel speed MXVW and the deceleration of the vehicle u according to other formula.

Figure 4:
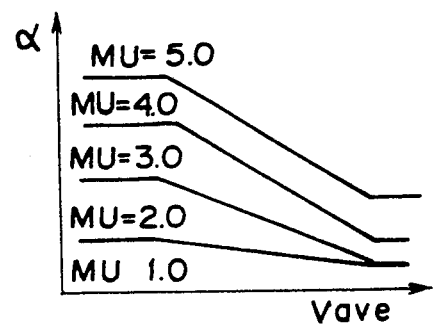
FIG. 4 is a view for illustrating an example of the manner for determining the friction coefficient of the road surface.

Then in step S4, it is determined whether the first estimated vehicle speed VREF1 is smaller than a predetermined value, 10Km/h in this particular embodiment. When it is determined in step S4 that the first estimated vehicle speed VREF1 is not smaller than 10Km/h, the control unit 17 adopts the first estimated vehicle speed VREF1 as the final estimated vehicle speed. Otherwise, it is determined in step S5 whether the friction coefficient MU of the road surface is not smaller than 3. The friction coefficient MU of the road surface is determined according to the map shown in FIG. 4 on the basis of the average Vave of the wheel speeds V1 to V4 at the time the first estimated vehicle speed VREF1 falls to 10Km/h and the deceleration of the vehicle $\alpha$. The friction coefficient MU of the road surface may be determined in other manner.

When it is determined in step S5 that the friction coefficient MU is not smaller than 3, a predetermined rate DLTV is set at 1.2g (g being acceleration of gravity) in step S6. Otherwise, it is determined in step S7 whether the friction coefficient MU is equal to 2. When it is determined that the friction coefficient MU is equal to 2, the predetermined rate DLTV is set at 0.6g. (step S8) When it is determined in step S7 that the friction coefficient MU is not equal to 2, that is, when the friction coefficient MU is 1, the predetermined rate DLTV is set at 0.3g. (step S9)

Then in step S10, the second estimated vehicle speed VREF2 is calculated according to the following formula.

$$VREF2 = VREF1 - \int DLTV dt \qquad (2)$$

VREF1 being 10Km/h in this particular embodiment. Then the second estimated vehicle speed VREF2 thus calculated is adopted as the final estimated vehicle speed.

That is, when the first estimated vehicle speed VREF1 is not smaller than 10Km/h, the slip ratio is calculated on the basis of the first estimated vehicle speed VREF1 calculated according to formula (1), and when the first estimated vehicle speed VREF1 falls below 10Km/h, the slip ratio is calculated on the basis of the second estimated vehicle speed VREF2 calculated according to formula (2).

The slip ratio is calculated, for instance, according to the following formula.

$$\text{slip ratio} = (\text{final estimated vehicle speed} - \text{wheel speed})/\text{final estimated vehicle speed}) \quad (3)$$

The slip ratio need not be limited to that calculated according to formula (3) but may be calculated according to other formulae so long as it is calculated on the basis of the final estimated vehicle speed and the wheel speed. For example, the slip ratio may be obtained by simply subtracting the wheel speed from the final estimated vehicle speed.

FIG. 5 is a flow chart showing another example of the manner in which the control unit 17 determines the final estimated vehicle speed.

In this embodiment, the predetermined rate DLTV is set at the value of the deceleration of the vehicle α at the time the first estimated vehicle speed VREF1 falls below the predetermined value, 10Km/h.

That is, the first estimated vehicle speed VREF1 is calculated in the same manner as the preceding example (steps P1 to P3), and when the first estimated vehicle speed VREF1 falls below 10Km/h, the predetermined rate DLTV is set at the value α' of the deceleration of the vehicle u at the time the first estimated vehicle speed VREF1 falls below 10Km/h. (steps P4 and P5)

Then in step P6, the second estimated vehicle speed VREF2 is calculated according to formula (2).

FIG. 6 is a flow chart showing still another example of the manner in which the control unit 17 determines the final estimated vehicle speed.

In this example, calculation of the first estimated vehicle speed VREF1 is continued even after the first estimated vehicle speed VREF1 falls below 10Km/h and calculation of the second estimated vehicle speed VREF2 is began, and the difference between the first estimated vehicle speed VREF1 and the second estimated vehicle speed VREF2 is continuously calculated. (steps Q1 and Q2) When the difference therebetween is not larger than a predetermined value Vo, the second estimated vehicle speed VREF2 is adopted as the final estimated vehicle speed as it is. On the other hand, when the difference becomes larger than the predetermined value Vo, the second estimated vehicle speed VREF2 is corrected with the value of the first estimated vehicle speed VREF1 at the time the difference exceeds the predetermined value Vo adopted as the predetermined value instead of 10Km/h. (step Q3) At this time, the predetermined rate DLTV may be set at the value determined in the same manner described above in conjunction with FIG. 3 according to the friction coefficient MU of the road surface at the time the difference exceeds the predetermined value Vo, or at the value of the deceleration of the vehicle u at the time the difference exceeds the predetermined value Vo.

FIG. 7 shows an example of the procedure for terminating the anti-skid brake control which is effected on the basis of the second estimated vehicle speed VREF2 calculated in the manner described above.

In FIG. 7, it is determined whether interruption determination flag F is 1. When it is determined that the flag F is not 1, it is determined in step R2 whether the second estimated vehicle speed VREF2 is smaller than 7Km/h. When it is determined that the second estimated vehicle speed VREF2 is still larger than 7Km/h, the anti-skid brake control is continued on the basis of the second estimated vehicle speed VREF2. (R3) On the other hand, when it is determined in step R2 that the second estimated vehicle speed VREF2 is smaller that 7Km/h, it is determined whether all the wheel speeds V1 to V4 are not larger than 5Km/h. (step R4) When it is determined in step R4 that at least one of the wheel speeds V1 to V4 is larger than 5Km/h, the anti-skid brake control is continued. (step R3) On the other hand, when it is determined in step R4 that none of the wheel speeds is larger than 5Km/h, the interruption flag F is set to 1 in step R5 and a timer is reset in step R6. Then when the friction coefficient MU of the road surface is not smaller than 3, the brake fluid pressure is increased by a large amount. (step R9 and R10) When the friction coefficient MU of the road surface is equal to 2, the brake fluid pressure is increased by a moderate amount while when it is equal to 1, the brake fluid pressure is increased by a small amount. (steps R9, R11 and R12)

Since the interruption flag F has been set to 1, the control unit 17 proceeds to step R7 in the next flow, and steps R8 to R12 are repeated until 500ms lapses. When 500ms has lapsed, the anti-skid brake control is interrupted and the interruption flag F is reset to 1. (steps R13 and R14).

We claim:
1. An anti-skid brake control system for a vehicle comprising
    a wheel speed detecting means which detects the speeds of wheels of the vehicle,
    a deceleration detecting means which detects the deceleration of the vehicle,
    a first estimated vehicle speed calculating means which calculates a first estimated vehicle speed on the basis of the highest of the speeds of the wheels as detected by the wheel speed detecting means and the deceleration of the vehicle as detected by the deceleration detecting means,
    a second estimated vehicle speed calculating means for calculating a second estimated vehicle speed which begins to reduce from a predetermined value at a predetermined rate independent from the change in the highest of the speeds of the wheels from the time the first estimated vehicle speed as calculated by the first estimated vehicle speed calculating means falls to the predetermined value,
    a selecting means which adopts the first estimated vehicle speed as a final estimated vehicle speed when the first estimated vehicle speed is not lower than the predetermined value and adopts the second estimated vehicle speed as the final estimated vehicle speed when the first estimated vehicle speed is lower than the predetermined value,
    a slip ratio calculating means which calculates the slip ratio of each wheel on the basis of the final estimated vehicle speed determined by the selecting means and the speed of the wheel as detected by the wheel speed detecting means, and a braking force control means which controls the braking force applied to each wheel so that the slip ratio of the wheel as calculated by the slip ratio calculating means converges on a target slip ratio.

2. An anti-skid brake control system as defined in claim 1 in which said predetermined rate is a constant value independent from the deceleration of the vehicle as detected by the deceleration detecting means.

3. An anti-skid brake control system as defined in claim 2 in which said constant value is increased with increase in the friction coefficient of the road surface.

4. An anti-skid brake control system as defined in claim 3 in which said friction coefficient of the road surface is calculated on the basis of the difference between the deceleration of the vehicle and the average of the speeds of the wheels and the value of the friction coefficient for a given deceleration is increased with increase in the average of the speeds of the wheels.

5. An anti-skid brake control system as defined in claim 1 in which said predetermined rate is the value of the deceleration of the vehicle as detected by the deceleration detecting means at the time when the first estimated vehicle speed falls below said predetermined value.

6. An anti-skid brake control system as defined in claim 5 in which said predetermined rate is corrected so that it is increased with increase in the friction coefficient of the road surface.

7. An anti-skid brake control system as defined in claim 6 in which said friction coefficient of the road surface is calculated on the basis of the difference between the deceleration of the vehicle and the average of the speeds of the wheels and the value of the friction coefficient for a given deceleration is increased with increase in the average of the speeds of the wheels.

8. An anti-skid brake control system as defined in claim 1 which further comprises a means for calculating the difference between the first estimated vehicle speed and the second estimated vehicle speed, and in which, when the difference therebetween exceeds a predetermined value, said second estimated vehicle speed in once corrected to the value of the first estimated vehicle speed at the time the difference therebetween exceeds a predetermined value, and is reduced from the corrected value at said predetermined rate.

* * * * *